United States Patent [19]
Gappa et al.

[11] 4,017,422
[45] Apr. 12, 1977

[54] METHOD AND APPARATUS FOR REGENERATING ABSORPTION PARTICLES

[75] Inventors: Günther Gappa, Gelsenkirchen-Buer; Harald Jüntgen; Jurgen Klein, both of Essen, all of Germany

[73] Assignee: Bergwerksverband GmbH, Essen, Germany

[22] Filed: Feb. 12, 1976

[21] Appl. No.: 657,406

[30] Foreign Application Priority Data

Feb. 15, 1975  Germany ............................ 2506394
May 2, 1975   Germany ............................ 2519669

[52] U.S. Cl. .............................. 252/417; 23/277 C; 23/288 S; 55/77; 55/181; 210/33; 210/269; 252/418

[51] Int. Cl.² .................. B01D 53/34; B01D 15/06

[58] Field of Search .......... 23/277 C, 288 B, 288 S; 55/34, 60, 61, 62, 77, 79, 99, 181, 208, 390; 201/31; 210/33, 80, 189, 269, 270; 252/416, 417, 418, 445

[56] References Cited

UNITED STATES PATENTS 2,419,245  4/1947   Arveson ............................ 252/417
2,758,066  8/1956   Brackin ........................... 252/417 X
3,634,026  1/1972   Kuechler et al. ............ 23/277 C X
3,700,563  10/1972  Karweil et al. ................. 252/417 X
3,929,585  12/1975  Grimmett ......................... 201/31 X

FOREIGN PATENTS OR APPLICATIONS 971,417   1/1959   Germany ............................ 55/390
721,181  12/1954   United Kingdom .................. 210/33

Primary Examiner—Frank A. Spear, Jr.
Assistant Examiner—Robert H. Spitzer
Attorney, Agent, or Firm—Michael J. Striker

[57] ABSTRACT

A housing has a foraminous floor adapted to support a bed of adsorption particles. A plurality of baffles spaced above this floor subdivide the bed into a plurality of compartments. Impurity-carrying particles are fed to the compartment at one end of the elongated chamber and the particles overflow a weir at the compartment at the other end of the chamber. A hot gas is passed up through the bed in all of the chambers to deadsorb the particles and the baffles are spaced so that in the direction of flow each baffle projects more deeply into the bed to flow the flow toward the outlet end. A gas above the furthest upstream compartment is collected and condensed to recover useful constituents, and the gas from the other compartments is burned. It is possible to provide an upstream and a downstream compartment at an upper level and below them several downstream compartments, with the gas from the downstream compartments flowing up through the two upper compartments. The chamber has a length equal to at least twice its width and preferably equal to approximately the same multiple of its width as number of compartments it is divided into.

8 Claims, 4 Drawing Figures

METHOD AND APPARATUS FOR REGENERATING ABSORPTION PARTICLES

CROSS-REFERENCE TO RELATED APPLICATIONS

This appliction is related to copending patent applications Ser. Nos. 598,385 and 602,000.

BACKGROUND OF THE INVENTION

The present invention relates to a method of and apparatus for regenerating an adsorption agent. More particularly this invention concerns the step of reactivating carbon or charcoal that has adsorbed impurities in waste water or the like.

After an adsorption agent such as activated-carbon particles has been used it is necessary to strip the adsorbed materials off the particles in a regeneration or deadsorption process. This is usually effected by contacting the particles with a hot gas that vaporizes and carries off the material adsorbed onto them.

In the commonest method the adsorption agent is loaded into one side or end of a multistage or rotating furnace. The particles flow from one side or end to the other of this furnace continuously. The rate of flow, which determines the treatment time, is calculated so that by the time the particles have reached the downstreamor outlet end of the arrangement they have been fully regenerated. In such an arrangement it is frequently necessary to use a very long residence time in the device, often up to several hours, and the particles are frequently abraded together to such an extent that they are effectively milled down to a smaller average particle size.

It has been suggested to use fluidized-bed reactor for the regeneration of active coal used in the purification of drinking water. In German Pat. No. 951,864 for instance, it has been suggested to provide a multistage fluidized-bed reactor. At least three superposed beds are provided which are interconnected via vertical feed tubes so that the particles flow from one side of one bed to the other, then drop down to the next bed and flow in the opposite direction to the end of that bed, then down to the next bed, and so on. Such a reactor is normally a very large structure and once again the particles are usually subjected to excessive abrasion inside the arrangement. Furthermore it is necessary to treat a large quantity of the adsorption particles at one time in order to completely fill the reactor and obtain uniform results.

In another known system (German Pat. No. 971,417) it has been suggested to feed the particles into one end of a horizontally elongated fluidized bed. A plurality of walls formed with or forming restrictions subdivide this bed into a plurality of compartments so as to slow down the flow rate from one end to the other of the particles. Such an arrangement does indeed reduce the abrasion of the particles and the overall size of the apparatus, however overactivation of the particles is a frequent occurrence and losses in the arrangement are in the region of 10% of the activated carbon fed in.

SUMMARY OF THE INVENTION

It is therefore an object of the present invention to provide an improved method of and apparatus for regenerating an adsorption agent.

Another object is to provide an improved system for deadsorbing activated carbon.

A further object is to provide such a system which is relatively small and easy to operate, but wherein the losses can be held below 3%.

These objects are attained according to the present invention in an arrangement wherein the particles are introduced into an upstream compartment of a horizontally elongated bed and are passed from this upstream compartment through a restriction into a downstream compartment. The hot gas is made to rise up through the particles in both of the compartments to fluidize the bed therein. The gas issuing from the bed in the upstream compartment is collected and condensed and the gas issuing from the particles in the downstream compartment is collected and after burnt. The particles are withdrawn from the downstream compartment at substantially the same rate the particles pass through the restriction into this downstream compartment. Thus a continuous process is obtained with particles entering the treatment chamber at one end and existing at the other end. It is possible in such a system to reduce residence time to a bare minimum and yet only suffer a loss of material of less than 3% on each regeneration.

According to other features of this invention the particles are passed sequentially from the upstream compartment through a succession of increasingly smaller restrictions into a succession of downstream compartments and the gases rising from all of the downstream compartments are jointly collected and after burnt.

In accordance with yet another feature of this invention the upstream compartment and one of the downstream compartments is oriented above the other downstream compartments. Particles are passed over a weir from the upper downstream compartment down into one of the other downstream compartments. The gases rising from the other downstream compartments all flow up through the upstream compartment and the upper downstream compartment.

The apparatus according to the present invention comprises a housing defining an elongated chamber having a pair of ends. A foraminous floor in the chamber is adapted to support a bed of the particles but allows gas flow up through itself. A plurality of vertically extending and displaceable baffles have longer edges spaced above the floor and subdivide the treatment chamber into an upstream compartment at one end of the chamber and a succession of downstream compartments. A weir in the downstream compartment at the other end of the housing has an upper edge lying above the lower edge of all of the baffles. Means is provided for introducing impurity-carrying adsorption particles into the upstream compartment so as to fill all of the compartments to the level of the upper edge of the weir and to overflow the weir, the particles flowing from each compartment to the adjacent compartment underneath the respective baffles. Particles are withdrawn from the chamber as they overflow the weir. A hot gas is forced up through the foraminous floor and fluidizes the bed of particles in all of the compartments. Means is provided for collecting gases in the chamber above the particles in the upstream compartment and segregating them from gases above the particles in the downstream compartment.

According to another feature of this invention the chamber has a length which is equal to at least twice the width of the chamber and is of generally rectangular shape. The lower edges of the baffles are progressively closer to the floor in the direction of flow of the particles in the chamber from the one end to the other end thereof. Means is also provided for collecting gases in the chamber above the particles in the downstream compartment and segregating them from the gases above the particles in the upstream compartment.

According to a particular arrangement of the present invention an upper elongated reaction chamber has a foraminous floor and is adapted to hold an upper bed of the agent. One of the baffles in the upper chamber extends down into the upper bed and subdivides it longitudinally into an upstream bed and an upper downstream bed communicating with the upstream bed. A lower elongated reaction chamber is provided directly under the upper chamber and itself has a foraminous floor so that it can hold the lower bed of the agent to be treated. Each of these chambers has a length at least twice as great as the respective width. At least one vertically displaceable baffle in the lower chamber extends down into the lower bed and subdivides it longitudinally into at least two communicating downstream beds. An overflow weir in the downstream compartment of the upper chamber is connected to a passage for conducting particles from the downstream bed of the upper chamber down into the downstream bed at one end of the lower chamber. An inlet is provided for feeding particles into the upstream compartment to create a flow therefrom under the upstream-chamber baffle into the downstream compartment of the upper chamber and then over the weir and into the downstream compartment at one end of the lower chamber, whence the particles can pass under the lower-chamber baffle into the other downstream compartment or compartments. The particles are withdrawn from the downstream compartment at the other end of the lower chamber and means is provided for passing a hot gas up through the lower bed to fluidize this bed and then through the upper bed to fluidize it. A hood collects gases rising from the upstream compartment only and feeds them to a condenser and another hood collects gases rising from the downstream compartment and feeds them to an afterburner.

In this arrangement the baffles extend down into the respective beds by distances equal to between 40 and 80% of the depth of the respective beds. In addition the flow cross-sections of the passages or restrictions defined by each of the baffles for flow into the adjacent compartment decreases in the direction of flow of the particles.

With the system according to the present invention the treatment time is very uniform for all of the particles so that a product of exactly uniform adsorption properties is obtained at the downstream end. Also since the treatment time is the same for all of these particles overactivation or heating of any of the particles can easily be avoided so that losses are kept well below 3%. The gentle treatment the particles receive in the fluidized-bed arrangement considerably reduces abrasion of them and prevent their average particle size from decreasing noticeably due to the regeneration operation.

The fluidized beds in accordance with the present invention have a depth equal to between three and five times the ratio of the cross-sectional area of the treatment chamber over its circumference, preferably four times. The adsorption agent normally lies on a layer between 20 mm and 100 mm thick of quartz sand or corundum pebbles having a particle size of between 1 mm and 2 mm. The bed depth is determined by the height of the overflow weir at the end of the treatment chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
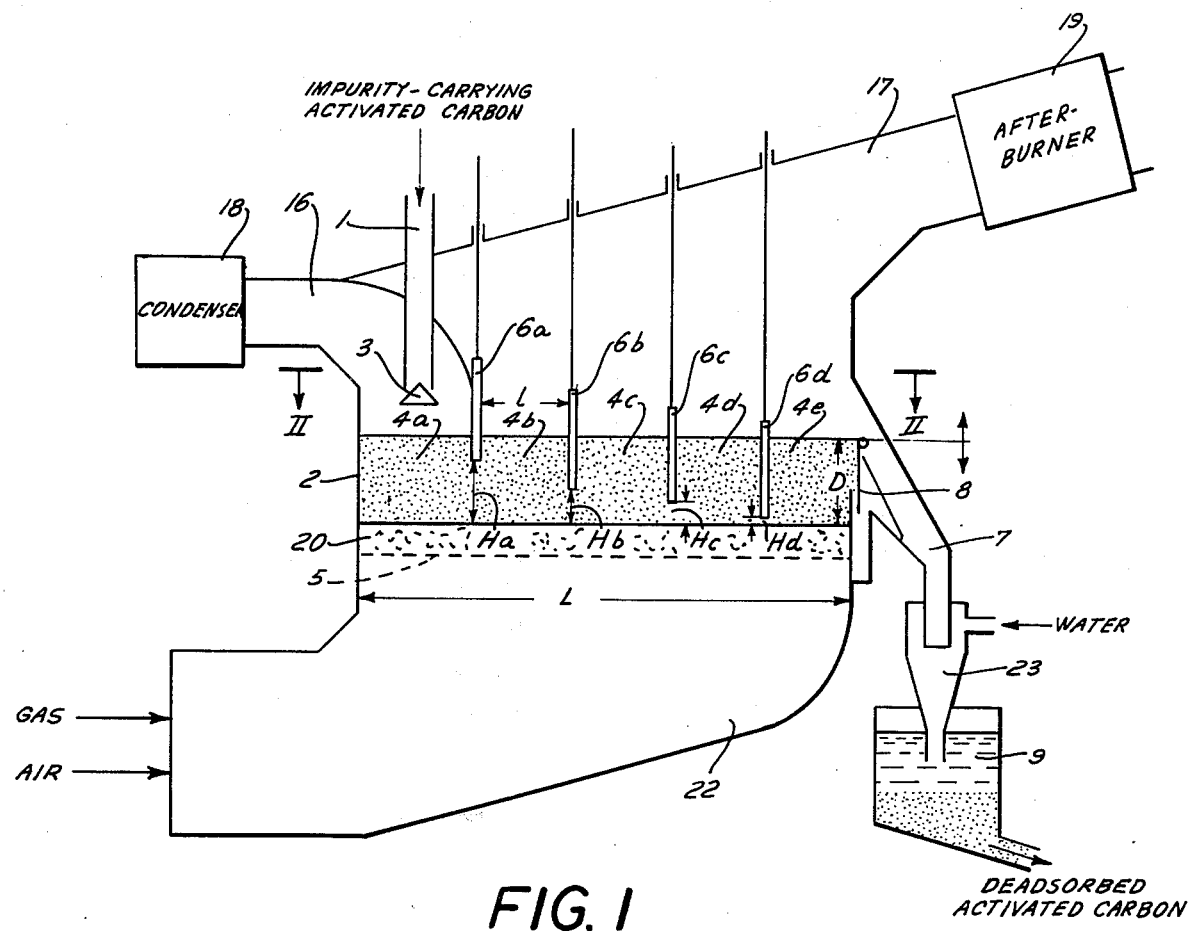
FIG. 1 is a schematic vertical section through an apparatus for carrying out the method according to the present invention.
Figure 2:
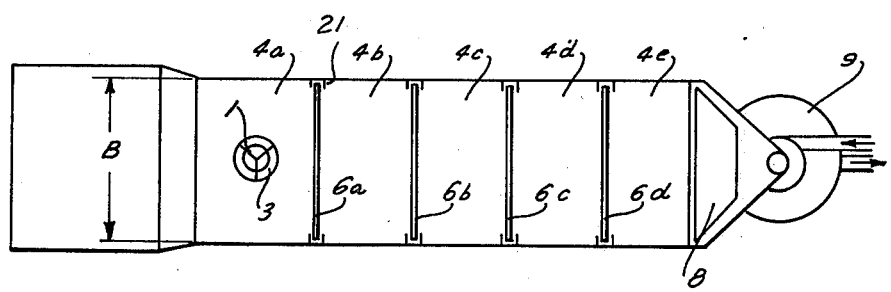
FIG. 2 is a section taken along line II—II of FIG. 1.

DESCRIPTION OF THE PREFERRED EMBODIMENTS:

The apparatus as shown in FIGS. 1 and 2 has a housing 2 provided with a foraminous floor 5, here made of perforated sheet metal, supporting a layer 20 of quartz sand having a mesh size of between 1 mm and 2 mm. The chamber defined above the layer 20 has overall ribs B and has an overall length L, the latter being equal to 4B.

A plurality of flat partitions or baffles 6a–d vertically slidable in guides 21 longitudinally subdivide the housing into five compartments 4a–e having length $l$ equal to 0.2 L.

A conduit 1 extending vertically out of the housing 2 above the upstream compartment 4a is provided below its lower end with a conical deflector 3 and serves to feed into this compartment 4a impurity-carrying activated carbon. The downstream side of the furthest downstream compartment 4e is defined by an overflow weir 8 which is vertically adjustable and defines within the housing 2 a depth D above the layer 20. The baffles 6a–d are adjusted so that their lower edges lie above the floor constituted by the layer 20 and sheet 5 by distances equal to between 0.8D and 0.2D, the spacing decreasing in the direction of flow.

An inlet pipe 22 serves to introduce hot gas and air into the space below the floor 5. A hood 16 leading to a condenser 18 is provided over the furthest upstream chamber 4a and another hood 17 leading to an afterburner 19 is provided over the chambers 4b–e.

Particles flowing over the weir 8 pass out through a discharge conduit 7 and then through a connection 23 where water is added to a gas lock 9 from which deadsorbed activated carbon can be withdrawn.

Figure 3:
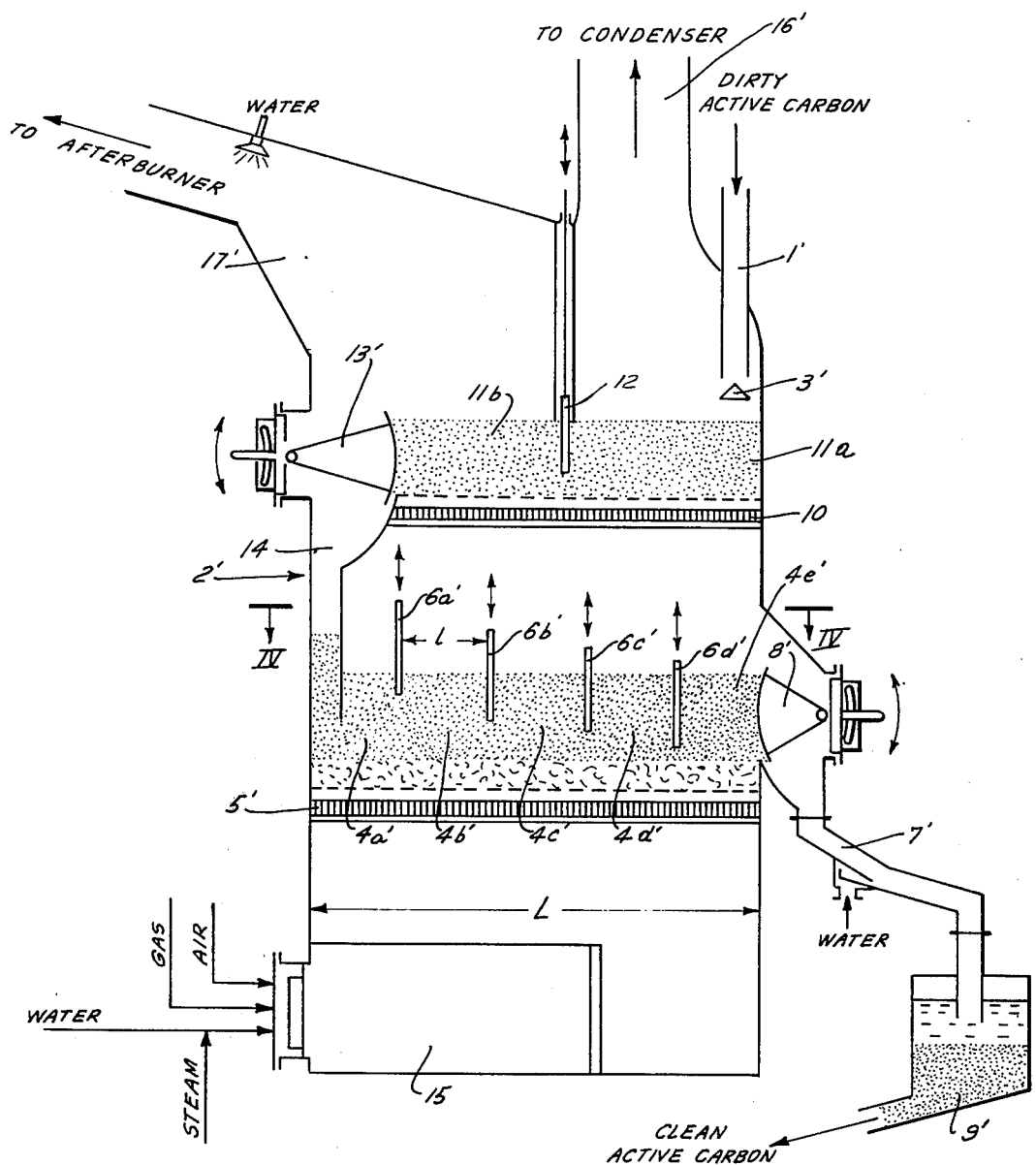
FIG. 3 is a section similar to FIG. 1 illustrating another arrangement in accordance with the present invention.
Figure 4:
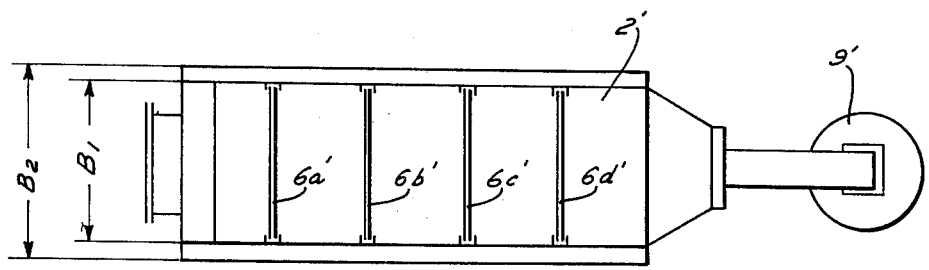
FIG. 4 is a section taken along line IV—IV of FIG. 3.

The arrangement of FIGS. 3 and 4 has housing 2' provided with a pair of foraminous floors 5' and 10 one above the other. Provided above the upper floor 10 is a baffle 12 subdividing the bed therein into a pair of compartments 11a and 11b. A pivotal weir 13' allows particles from the compartment 11b to pass down in a conduit 14 to the furthest upstream of five compartments 4a', 4b', 4c', 4d' and 4e', defined by respective baffles 6a', 6b', 6c' and 6d'. The downstream side of the compartment 4e' is defined by a vertically pivotal weir 8 from which leads a discharge conduit 7' to a gas lock 9'. A conduit 1' with a spreader 3' can feed dirty active carbon into the upstream chamber 11a.

A combustion chamber 15 below the lower floor 5' is fed water, steam, gas, and air so that very hot gases can rise through the floor 5' and through the beds in the compartments 4a'–4e'. Thence the air flows up through the floor 10 and the beds 11a and 11b whence it is captured by the conduits 16' and 17' and either condensed or afterburnt, respectively.

EXAMPLE I

In an apparatus as shown in FIGS. 1 and 2, 0.4 m$^3$/h of active carbon is used for the purification of 30 m$^3$/hof waste water from a coking plant having a content of 1200 mg/l of various organic carbon compounds. When the impurity level in the water increases to 1800 mg/l the need of active coal increases to 0.55 m$^3$/h.

The regeneration takes place in a fluidized-bed reactor having a length L of 2.8 m and a width B of 0.7 m. Three separate baffles spaced at 0.7 m are used whose lower edges can be held at a distance of between 0.1 m and 0.36 m from the floor of the bed. The overflow weir 8 can be adjusted for a depth D of between 0.0 m and 0.45 m continuously. In this arrangement it was set at 0.33 m. The furthest upstream baffle is set to block 40% of the cross-sectional area of the bed,the second one 60%, and the third one 80%, so that they extend down into the bed by respective distances of 0.13 m, 0.2 m and 0.26 m.

Hot gas at a temperature of 820° C is fed through the bed. It is possible fully to regenerate the activated carbon with a loss of only 2.5%. The treatment time is 22 minutes.

If the gas temprature is raised to 860° C the activated-carbon loss is increased to 2.8°%. If it is desired to increase the throughflow from 0.4 to 0.55 m$^3$/h the height of the weir 8 must be increased from 0.33 to 0.45 m and the spacings of the baffles appropriately changed.

Gas is recovered at the conduit 16 at a rate of 900 m$^3$/h and when the waste water treated by the activated carbon being purified had a phenol content of approximately 1000 mg/h, approximately 20 kg/h of phenol were recovered. The remaining gas exiting through conduit 17 has a volume of 1800 m$^3$/h and is afterburned.

With this system it was discovered that by fully elevating the baffles approximately the same output was achieved, by approximately 15% of the activated carbon was lost in each process.

EXAMPLE II

The arrangement shown in FIGS. 1 and 2 was also usable with aluminum oxide as an adsorption means. For the purification of 210 m$^3$/h of fuel-cell water having an organic-material content (TOC) of 450 g/m$^3$ it was necessary to use approximately 800 kg/h of Al$_2$O$_3$ having a particle size of between 1.5 mm and 2.5 mm. The regeneration of the charged aluminum oxide took place in a chamber having a length L of 3.2 m and a width B of 0.8 m. Three baffles spaced apart by a distance l = 0.7 m were used, each baffle being adjustable so that its lower edge lay between 0.1 m and 0.4 m above the lower surface of the bed which was defined by the upper surface of the corundum-pebble layer under this bed. The overflow weir, which was adjustable between 0.0 m and 0.5 m, was set at 0.3 m.

The three baffles were set so that the furthest upstream one blocked 40% of the cross section of the bed, the second one 60% and the third one 80%. In order to achieve a product having an activity almost identical to those of the unused aluminum oxide a town gas was burned with air and used at a rate of 600 m$^3$/h. The product had extremely uniform characteristics.

EXAMPLE III

The apparatus of FIGS. 3 and 4 was used to treat the water described in Example I. The upper chamber had a length of 1.35 m and a width of 0.55 m. Its depth was equal to 0.10 m and the baffle 12 extended down into the bed by a distance of 0.06 m. The treatment time at a rate of 0.4 m$^3$/h of activated coal was equal to 12 minutes in the upper level. The lower bed had a length of 2.0 m and a width of 2.55 m, its overflow weir was set for a depth of 0.11 m. The treatment time in the lower lever was 18 minutes. The three baffles in the lower level were separated by a distance 1 of 0.5 m and projected into the bed so as to block 40, 60, and 80% of the flow cross section in the bed, so that they projected respectively 0.004 m, 0.07 m, and 0.09 m down into the bed.

Gas used at a rate of 1500 m$^3$/h (at a standard temperature and pressure) was employed at a temperature to heat the bed to 820° C.

After passing through the bed water was sprayedon the gas so as to cool it at the upstream chamber to approximately 180° C and elsewhere to a temperature of approximately 350° C. The gas in the last-mentioned region was fed to a condenser at a rate of approximately 700 m$^3$/h (again at standard temperature and pressure). In the condenser approximately 35 kg/h of phenol were recovered when the waste water being treated had a content of 100 mg/l. The remaining gases, at a rate of 800 m$^3$/h, were fed to an afterburner.

In this arrangement the overall loss was approximately 2.4%. The regenerated active coal had virtually the same adsorption capacity as when it was completely fresh and unused.

It will be understood that each of the elements described above, or two or more together, may also find a useful application in other types of systems differing from the types described above.

While the invention has been illustrated and described as embodied in a regenerator, it is not intended to be limited to the details shown, since various modifications and structural changes may be made without departing in any way from the spirit of the present invention.

Without further analysis, the foregoing will so fully reveal the gist of the present invention that otherscan, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for regenerating an adsorption agent, said apparatus comprising: an upper elongated reaction chamber having an upper foraminous floor and adapted to hold an upper bed of said agent; a vertically displaceable upper baffle in said upper chamber extending down into said upper bed and subdividing same longitudinally into an upstream bed and a downstream bed communicating therewith; a lower elongated reaction chamber under said upper chamber having a lower foraminous floor and adapted to hold a lower bed of said agent, each of said chambers having a length at least twice as great as the respective width; a plurality of vertically displaceable lower baffles in said lower chamber extending down into said lower bed and subdividing same longitudinally into a succession of communicating downstream beds; means including an overflow weir in said downstream bed of said upper chamber for conducting particles from said downstream bed of said upper chamber into the downstream bed at one end of said chamber, said lower baffles having respective lower edges spaced from said lower floor by distances decreasing from said one end; means for feeding particles into said upstream bed to create a flow therefrom into the downstream bed of said upper chamber and thence down and sequentially through the downstream beds of said lower chamber; means for withdrawing particles from the downstream bed at the other end of said lower chamber; means for passing a hot gas up throughsaid lower bed to fluidize same and thence through said upper bed to fluidize same; means connected to said upper chamber for collecting and condensing gases rising from said upstream bed; and means connected to both said chambers for collecting and afterburning gases rising from said downstream beds.

2. The apparatus defined in claim 1 wherein said upper and lower beds are of respective predetermined depths and the respective baffles extend down into the respective beds by respective distances equal to between 40 and 80% of the respective depths.

3. The apparatus defined in claim 1 wherein said baffle in said upper chamber defines therein a restriction of predetermined flow cross-section between said upstream bed and said downstream bed of said upper chamber and said baffle in said lower chamber defines therein a restriction of smaller flow cross-section.

4. An apparatus for deadsorbing impurity-carrying adsorption particles, said apparatus comprising: a housing defining an elongated chamber having a pair of ends; a foraminous floor in said chamber adapted to support a bed of said particles; a plurality of vertically extending and displaceable baffles having lower edges spaced above said floor and subdividing said chamber into an upstream compartment at one end thereof and a succession of downstream compartments, said lower edges being progressively closer to said floor away from said one end, whereby particles in each compartment but the downstream compartment at the other end of said housing can flow under the respective baffle into the adjacent compartment; a weir in said downstream compartment at said other end of said housing and having an upper edge lying above the lower edges of all of said baffles; means for introducing said impurity-carrying particles into said upstream compartment and thereby filling all of said compartments to the level of said upper edge and causing particles to overflow said weir; means for withdrawing from said chamber particles as they overflow said weir; means for passing a hot gas through said floor for fluidizing the beds of particles in all of said compartments; and means for collecting gases in said chamber above said particles in said upstream compartment and segregating them from gases above said particles in said downstream compartment.

5. The apparatus defined in claim 4 wherein said chamber has a length and has a width equal to at most half of said length.

6. The apparatus defined in claim 4, further comprising means for collecting gases in said chamber above said particles in said downstream compartments and segregating them from the gases above said particles in said upstream compartment.

7. A method of regenerating adsorption particles, said method comprising the steps of:
  introducing said particles into an upstream compartment to form an upstream bed therein;
  passing said particles from said upstream bed through an upstream restriction into the first of a succession of downstream compartments to form a downstream bed therein;
  subdividing said downstream compartments from each other with a plurality of downstream restrictions of size decreasing from said first downstream compartment and passing said particles from said first downstream compartment through said restrictions to the last downstream compartment;
  withdrawing particles from said last downstream compartment at substantially the same rate said particles pass through said upstream restriction into said first downstream compartment;
  flowing a hot gas up through said particles in all of said compartments to fluidize said beds;
  collecting and condensing the gas rising from said upstream bed; and
  collecting and afterburning all the gas rising from said downstream bed, whereby impurities adsorbing into said particles are carried off by the gases rising from said beds.

8. The method defined in claim 7, further comprising the steps of: orienting said upstream compartment and said first downstream compartment above the other downstream compartments; passing said particles over a weir from said first downstream compartment and down into one of said other downstream compartments; and flowing all of the gases rising from said other downstream compartments up through said upstream compartment and said first downstream compartment.

* * * * *